Feb. 7, 1928.
A. CHAMPION
1,658,552
SPEEDOMETER DRIVE SHAFT
Filed Aug. 11, 1926
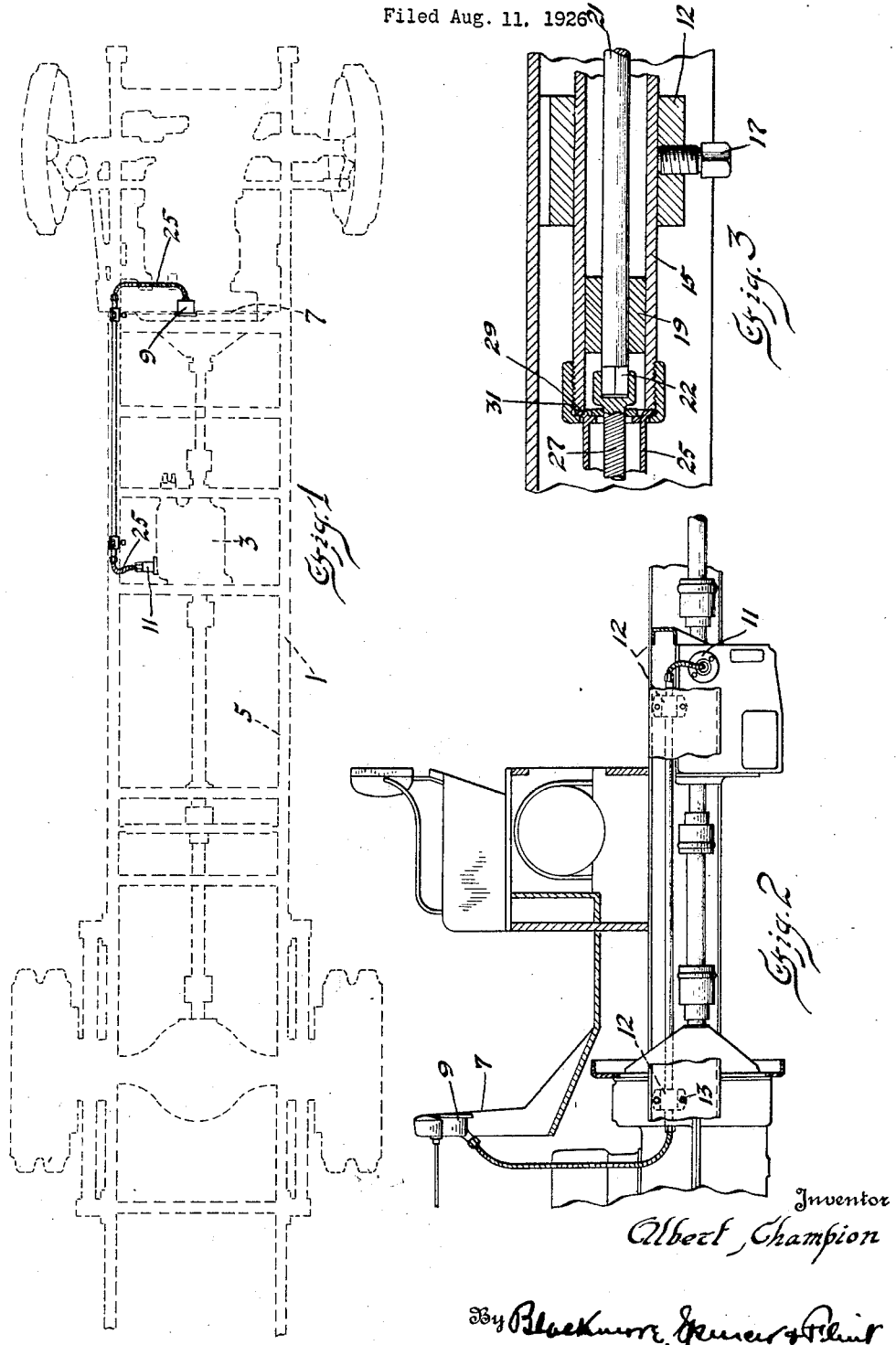
Inventor
Albert Champion Patented Feb. 7, 1928.

1,658,552

UNITED STATES PATENT OFFICE.

ALBERT CHAMPION, OF FLINT, MICHIGAN, ASSIGNOR TO A C SPARK PLUG COMPANY, OF FLINT, MICHIGAN, A COMPANY OF MICHIGAN.

SPEEDOMETER DRIVE SHAFT.

Application filed August 11, 1926. Serial No. 128,647.

This invention relates to a driving shaft for a measuring instrument. It has been designed more particularly in connection with the transmission mechanism for operating the driven member of a speedometer from a part, the speed of which is to be measured.

An object of the invention is to provide an improved driving shaft in the relation stated.

The invention is herein fully described and is illustrated in the accompanying drawing.

In the drawing:

Figure 1 is a plan view of a vehicle chassis having my invention applied thereto.

Figure 2 is a view in elevation partly in section.

Figure 3 is a longitudinal sectional detail.

Referring by reference characters to the drawing, numeral 1 is used to designate the vehicle chassis, 3 being applied to the transmission housing and 5 to the frame member of the chassis. Upon the instrument board 7 is a speedometer 9 of any preferred construction. The transmission housing has a fitting 11 to carry a shaft geared to certain of the shafts within the housing utilized in connection with the usual drive for the vehicle. In the ordinary arrangement a flexible shaft contained in a flexible housing transmits the drive from the power take-off shaft of the transmission housing to the speedometer. The flexible drive shaft or cable is subject to a twisting action which is productive of no objectionable results as ordinarily used where the length of the cable is not unduly great. However, on some vehicles, such as trucks, where the distance between the transmission housing and the instrument is considerable, there arises an objection to the use of a long flexible cable owing to the excessive twisting action. To overcome this objection I provide the following remedy. A rigid driving rod or shaft is introduced into the drive mechanism between the transmission housing and the speedometer. Preferably this rigid driven shaft will be as long as conveniently possible and its ends are connected by the usual flexible cable to the instrument at one end and to the power take-off shaft at the other end. To this end at two points along the chassis frame substantially opposite the instrument and the transmission housing are clamps 12 held by fastenings means 13. A tubular shaft 15 is secured within these clamps by the use of set screws 17. Within the tubular housing 15 and carried by bearings 19 therein is a driving rod or shaft 21, the same being non-circular in shape at its ends, as shown at 22. The shaft 21 is substantially the same length as the tubular member 15. Externally the ends of the housing 15 are to be connected to the flexible housing 25 carrying the flexible drive shaft 27. For the purpose of this connection the drive shaft 27 is shown as equipped with a non-circular opening at its end to receive the correspondingly shaped end 22 of shaft 21. The flexible housing 25 is outwardly flared at its end to form an abutment 29 holding a threaded collar 31, which collar engages the external threads on the tubular member 15. A connection such as described is made at each of the two ends of the tubular member 15. One flexible drive is connected as usual with the speedometer, as shown in Figure 1 and the other connection is made with the power take-off at the transmission housing.

By the above described arrangements the excessive twist of the driving cable is avoided in those instances where the measuring instrument is located at an unusually great distance from the source of power which is to operate it. The instrument is therefore more quickly responsive to speed changes.

While the source of power as herein shown is the power take-off associated with the transmission housing it will be understood that the invention may be embodied in a structure where the power is taken off elsewhere than at the transmission housing 3 as, for example, at the rear axle, or from the front wheels. In either of these cases it will be readily understood that use may be made of a rigid driving shaft having its ends connected by flexible cables with the driven instrument and with the driving means. It is also possible that under certain circumstances the rigid shaft may be directly connected to either the driving or driven element in which case the invention may be embodied with the use of a single flexible connection.

I claim:

In a vehicle, a chassis frame, an elongated member mounted thereon, a rigid shaft rotatable mounted therein, a measuring instrument, driving means therefor, flexible driving connections between the ends of said driving shaft and said measuring instrument and driving means, respectively.

In testimony whereof I affix my signature.

ALBERT CHAMPION.